(No Model.)
J. R. WHITTEMORE.
HARROW.
No. 315,579. Patented Apr. 14, 1885.
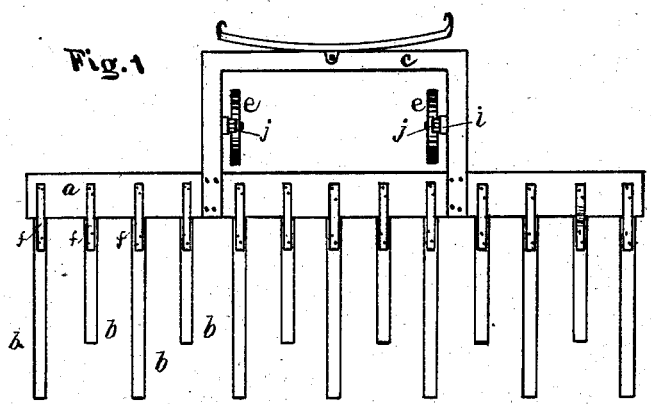
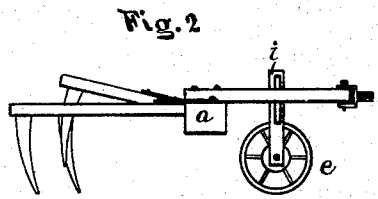
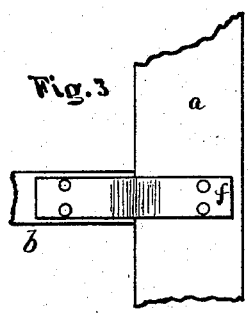
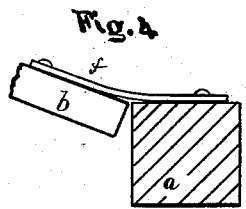
Witnesses:
D. W. Northrop
L. B. Bunker
Inventor:
John R. Whittemore
by Allen Webster
Atty

UNITED STATES PATENT OFFICE.

JOHN R. WHITTEMORE, OF CHICOPEE FALLS, MASSACHUSETTS.

HARROW.

SPECIFICATION forming part of Letters Patent No. 315,579, dated April 14, 1885.

Application filed January 4, 1883. (No model.)

*To all whom it may concern:*

Be it known that I, JOHN R. WHITTEMORE, of Chicopee Falls, in the county of Hampden and State of Massachusetts, have invented new and useful Improvements in Harrows, of which the following is a specification, reference being had to the accompanying drawings, in which—like letters of reference indicating like parts—

Figure 1 is a top and Fig. 2 a side view of my harrow. Figs. 3 and 4 illustrate the detail of construction.

My invention consists in the novel methods of connecting the tooth-beam with the main beam or frame and in holding the tooth-beam in position.

*a* represents the main beam, to which the tooth-beams are attached.

*b* represents the tooth-beams; C, the draw-frame; *e*, the regulating-wheels; *f*, a flat metalic spring, and *i* an adjusting-piece.

The construction will be readily understood on referring to the drawings.

I am aware that harrows have heretofore been made having the tooth-beams secured to the main beams with U-shaped springs. These are expensive, and tend to make the device complicated.

I am also aware that in a grain-drill the furrow-share bar has heretofore been connected with the lever by a spring, as shown in Letters Patent No. 35,713, and that a spring has been used in cultivators, planters, and drills, to hold the tooth in the earth, as shown in Letters Patents Nos. 106,039, 52,445, and 120,742.

I am also aware of Letters Patent No. 186,873, dated January 30, 1877. The manner of application, however, in those several machines and the construction are not the same as shown and used by me, and I make no claim to the application or construction as therein shown.

I am aware that in a gang-plow the beams carrying the plows have been attached to the carriage by hinges fixed to the upper faces of the meeting beams, and having springs with one end fixed to the upper and lower sides of the beams of the carriage, and the free ends reaching over and pressing upon the beams carrying the gang.

I am also aware that a connection has been made between a shaft and a drill-bar in a seed-planter, consisting of a drag hook or chain fixed to the shaft and extended to the end of the bar, and the shaft and bar further connected by a bent spring, and I make no claim to such specific constructions.

My improvements consist in abutting the rear face of the cross-beam and the front end of the beam carrying the tooth with their upper faces on the same horizontal line, and then securing these parts by a straight spring laid flat on their upper faces and secured as stated. I use a straight spring, and bolt the same to the top of the main beam and tooth-beam, the end of the tooth-beam being adapted to strike against the main beam when the tooth-beam is in its normal position, thus preventing the tooth being forced too far into the earth, without the use of any other appliance; and this application of a simple straight spring does away with the necessity of a hinge as used in the machines above referred to. I secure a flat spring, *f*, to the main beam and tooth-beams in the manner shown in Figs. 3 and 4. The spring thus acts both as a spring and hinge.

The object of providing a spring-connection is to allow each tooth to automatically relieve itself from obstructions without affecting the operation of the other teeth. The depth of drag is regulated by adjusting the wheels *e* as may be required by loosing the bolt *j*, which passes through the slotted piece *i* upon which the wheels have bearings.

I do not confine myself to any particular form of tooth.

Having therefore described my invention, what I claim as new, and desire to secure by Letters Patent, is—

The draw-beam and the tooth-beam arranged with their upper faces on the same horizontal line, and the rear face of the draw-beam abutting square against the end face of the tooth-beam, in combination with a straight spring laid flat on the upper faces of said beams with one end rigidly secured to and across the draw-beam, and the other end extended and rigidly secured to the top face of the tooth-beam, substantially as and for the purpose set forth.

JOHN R. WHITTEMORE.

Witnesses:
ALLEN WEBSTER,
L. P. BUNKER.